United States Patent
Conti et al.

(10) Patent No.: US 9,447,207 B2
(45) Date of Patent: Sep. 20, 2016

(54) SOLID CATALYST COMPONENT AND PROCESS FOR THE (CO)POLYMERIZATION OF ETHYLENE

(71) Applicants: Giuseppe Conti, Milan (IT); Corrado Adesso, Brindisi (IT); Francesco Menconi, San Donato Milanese (IT); Francesco Masi, Sant'Angelo Lodigiano-Lodi (IT)

(72) Inventors: Giuseppe Conti, Milan (IT); Corrado Adesso, Brindisi (IT); Francesco Menconi, San Donato Milanese (IT); Francesco Masi, Sant'Angelo Lodigiano-Lodi (IT)

(73) Assignee: VERSALIS S.p.A., San Donato Milanese (IT)

( * ) Notice: Subject to any disclaimer, the term of this patent is extended or adjusted under 35 U.S.C. 154(b) by 0 days.

(21) Appl. No.: 13/649,248

(22) Filed: Oct. 11, 2012

(65) Prior Publication Data

US 2013/0040805 A1  Feb. 14, 2013

Related U.S. Application Data

(62) Division of application No. 10/578,873, filed as application No. PCT/EP2004/012746 on Nov. 9, 2004, now abandoned.

(30) Foreign Application Priority Data

Nov. 14, 2003 (IT) ............... MI2003A2206
Sep. 10, 2004 (IT) ............... MI2004A1722

(51) Int. Cl.
*C08F 4/654* (2006.01)
*C08F 4/656* (2006.01)
*C08F 4/64* (2006.01)
*B01J 31/00* (2006.01)
*C08F 10/02* (2006.01)
*C08F 210/16* (2006.01)

(52) U.S. Cl.
CPC ............ *C08F 10/02* (2013.01); *C08F 210/16* (2013.01)

(58) Field of Classification Search
None
See application file for complete search history.

(56) References Cited

U.S. PATENT DOCUMENTS

| | | |
|---|---|---|
| 5,278,117 A | 1/1994 | Luciani et al. |
| 5,290,745 A | 3/1994 | Jorgensen et al. |
| 5,324,805 A | 6/1994 | Kioka et al. |
| 5,780,378 A | 7/1998 | Toida et al. |
| 6,200,923 B1 | 3/2001 | Garoff et al. |
| 6,723,809 B1 | 4/2004 | Menconi et al. |
| 2004/0010101 A1* | 1/2004 | Wagner et al. ............ 526/124.3 |
| 2006/0014631 A1 | 1/2006 | Masi et al. |
| 2012/0322959 A1 | 12/2012 | Masi et al. |

FOREIGN PATENT DOCUMENTS

EP  0 768 322  4/1997

OTHER PUBLICATIONS

U.S. Appl. No. 10/252,605, filed Sep. 24, 2002, Conti, et al.

* cited by examiner

*Primary Examiner* — Yun Qian
(74) *Attorney, Agent, or Firm* — Oblon, McClelland, Maier & Neustadt, L.L.P.

(57) ABSTRACT

Catalyst and solid component of catalyst for the (co)polymerization of ethylene, comprising titanium, magnesium, chlorine, a protic organo-oxygenated compound $D_p$ and a neutral aprotic electron-donor compound D, in the following molar ranges: $Mg/Ti=1.0-50$; $D/Ti=1.0-15$; $Cl/Ti=6.0-100$; $D_p/D=0.05-3$; and a process for obtaining said component.

9 Claims, No Drawings

SOLID CATALYST COMPONENT AND PROCESS FOR THE (CO)POLYMERIZATION OF ETHYLENE

This is a divisional application of U.S. application Ser. No. 10/578,873, filed Dec. 15, 2006, which is a 371 of PCT/EP04/12746 filed on Nov. 9, 2004.

The present invention relates to an improved solid component of catalyst for the (co)polymerization of ethylene and the (co)polymerization processes in which said component is used.

More specifically, the present invention relates to a solid component of catalyst and the catalyst obtained therewith, based on titanium, magnesium and chlorine, possibly also comprising an inert solid, suitable for effecting polymerization and copolymerization processes of ethylene, especially in gas phase, to obtain linear polyethylenes, preferably having low to ultra-low density.

As is known, linear low density polyethylenes (also referred to as LLDPE) form a group of thermoplastic polymers widely used in numerous practical applications, due to their good combination of rheological, mechanical and thermal properties which make them suitable for processing in the molten state for the manufacturing of mono- and multilayer sheets and films having a good weldability, resistance to tear and perforation, flexibility and transparency.

These polyethylenes consist of ethylene copolymers with quantities varying from 0.1 to 20% in moles of one or more other monomers (comonomers) selected from primary alpha-olefins having from 4 to 10 carbon atoms, sometimes also containing propylene in much lower amounts with respect to said alpha-olefins. They are obtained by means of accurately selected variants of the Ziegler-Natta polymerization process, by polymerizing ethylene in a mixture with suitable quantities of the desired comonomer(s), so that, on the basis of the relative reactivity ratios and other factors depending on the characteristics of the catalyst and process conditions, a certain quantity of the above alpha-olefins is inserted in the chain formed by the ethylene monomeric units. On the basis of the quantity and type of comonomer inserted and its distribution, which is seldom completely statistic, LLDPE are obtained with different properties.

Methods and further details of what is specified above can be easily found in the enormous quantity of publications on the subject, among which, the treatise "Encyclopedia of Polymer Science and Engineering", John Wiley & Sons Ed, Second Edition (1986), volume 6, pages 429-453, can be mentioned, for example.

Ziegler-Natta catalysts suitable for forming substantially linear ethylene copolymers, having a high molecular weight, generally consist of a solid component, comprising a compound of the elements of group 4 to 6 of the periodic table, preferably titanium, vanadium or chromium, in contact with an aluminum alkyl or an aluminum alkyl chloride. Numerous variations and alternatives have been proposed, among which the introduction of an active catalyst support, consisting of magnesium dichloride with a complex morphology, is particularly important.

U.S. Pat. No. 3,642,746, for example, describes a solid component of catalyst obtained by contact of a transition metal compound with magnesium chloride treated with an electron donor. According to the U.S. Pat. No. 4,421,674 a solid component of catalyst is obtained by contact of a transition metal compound with the spray drying product of a solution of magnesium chloride in ethanol.

According to patent UK 1,401,708 a solid component of catalyst is obtained by interaction of a magnesium halide, a non-halogenated transition metal compound and an aluminum halide. U.S. Pat. Nos. 3,901,863 and 4,292,200 describe solid components of catalyst obtained by putting a non-halogenated magnesium compound, a non-halogenated transition metal compound and an aluminum halide in contact with each other. The product thus obtained is a mixed chloride whose crystalline structure has lattice imperfections which are suitable as polymerization active centres of ethylene and alpha-olefins.

U.S. Pat. No. 4,843,049 and European patent application EP-243,327, describe a solid component of catalyst containing titanium, magnesium, aluminum, chlorine and alkoxyl groups, highly active in ethylene (co)polymerization processes, carried out at low pressure and temperature, through the suspension technique and, respectively, at high pressure and temperature, in vessel or tubular reactors. These solid components are generally obtained by spray drying an ethanolic solution of magnesium chloride to obtain an active support which reacts in sequence with a titanium tetra-alkoxide or with titanium tetrachloride and aluminum alkyl chloride, respectively.

The paper published in "Polymer" vol. 34(16), 1993, pages 3514-3519, shows the effect of the addition of certain amounts of protic compounds to the co-catalyst, consisting of an aluminum trialkyl, in the formation of solid polymerization catalysts based on Ti and Hf supported on magnesium chloride. A decrease in the activity is generally observed together with an increase in the molecular weight of the polymer obtained.

Catalysts are also known in the known art, in which the transition metal compound is fixed to a solid carrier, of an organic or inorganic nature, optionally physically and/or chemically treated so as to obtain a suitable morphology. Examples of these solid carriers are oxygenated compounds of bivalent metals (such as oxides, oxygenated and carboxylated inorganic salts), or hydroxy chlorides or chlorides of bivalent metals, especially magnesium chloride.

Solid components of catalyst obtained by activating a complex containing magnesium, titanium, halogen, alkoxyl groups and an electron donor, with an aluminum halide, are particularly known in the art. This kind of complex can be deposited on a carrier, especially a porous carrier and then activated to give solid components of catalyst which are particularly suitable for the polymerization or copolymerization of ethylene in gaseous phase. For this known art, reference should be made to what is described and illustrated in U.S. Pat. No. 4,293,673, U.S. Pat. No. 4,302,565, U.S. Pat. No. 4,302,566, U.S. Pat. No. 4,303,771, U.S. Pat. No. 4,354,009, U.S. Pat. No. 4,359,561, U.S. Pat. No. 4,370,456, U.S. Pat. No. 4,379,758, U.S. Pat. No. 4,383,095 and U.S. Pat. No. 5,290,745.

Even if these processes and catalysts allow polyethylenes to be obtained in granular form with a good industrial productivity, thanks to the polymerization carried out in gas phase, they have proved to be not completely satisfactory as far as the rheological characteristics of the particulate are concerned, due to the presence of fine products, the friability of the granules and a certain residual tackiness, which tend to produce clotting areas. It would be desirable, moreover, to further improve the productivity of these processes, in terms of amount of polymer obtained per unit of weight of catalyst.

A further problem deriving from the residual tackiness of certain polyethylenes, especially linear low density polyethylenes (LLDPE), which has been observed, relates to the transportation, storage and subsequent processing of these materials both in granular form, due to the possible formation of blocks and clots, and in the form of films, due to the difficulty of separating and unrolling the bobbins of film.

Particularly serious drawbacks are encountered when the above processes in gas phase are used for the production of linear polyethylenes having a density equal or below 0.915 g/ml, especially between 0.900 and 0.912 g/ml, which are widely used in the film area. In this case, in fact, there is not only an increase in problems relating to the residual tackiness of the granulate, which tends to become deformed and to clot, making transportation, storage and subsequent material processing operations difficult due to the possible formation of clots, or as a result of the difficulty in separating and unrolling the film bobbins, but the polymerization step itself is carried out with a certain difficulty, and is almost impracticable on an industrial scale below a density of 0.910, due to the weight increase of the fluid bed, until its possible collapse. For this reason, the production of LLDPE having a density below 0.915 (also known as VLDPE) is still mainly achieved with suspension, solution or high-pressure processes, in which, however, there are still drawbacks relating to the use of a liquid medium acting as diluent.

A process and catalyst capable of producing polyethylenes within a low or very low density range, having such characteristics as to allow the gas phase method to be adopted, would undoubtedly represent a considerable improvement. It would also be highly desirable to achieve a high productivity of the process, to increase the product volumes and reduce the amount of residual impurities of the catalyst.

It has now been found that it is possible to obtain solid components of Ziegler-Natta catalyst on a carrier prepared from a magnesium chloride made soluble in a polar compound, by means of a simple and convenient process which allows catalysts to be obtained with an improved catalytic activity and selectivity to give a copolymer of ethylene having excellent rheological and mechanical properties and an extremely reduced residual tackiness, even after long storage times at temperatures up to 50° C. In particular, it has been found that significant lower tackiness is obtained for linear polyethylenes having density equal to or lower than 0.950 g/ml, and further, the achievement of polyethylenes with densities as low as from 0.900 to 0.915 g/ml has been made available by a gas phase process.

In accordance with this, the present invention relates to a solid component of catalyst for the (co)polymerization of ethylene, comprising titanium, magnesium, chlorine, an organo-oxygenated protic compound $D_p$ and a neutral electron-donor aprotic compound D, in the following molar ranges:
Mg/Ti=1.0-50; D/Ti=1.0-15;
Cl/Ti=6.0-100; $D_p$/D=0.05-3.

Said solid component can be advantageously obtained by means of a process which forms a second object of the invention, comprising the following steps in succession:
(a) formation of a mixture and dissolution, in said electron-donor aprotic compound D, of a magnesium chloride and a titanium compound having formula (I):

$$Ti^v(OR^3)_a X_{(v-a)} \qquad (I)$$

wherein each $R^3$ represents a hydrocarbyl or acyl radical having from 1 to 15 carbon atoms;
each X is selected from chlorine, bromine or iodine;
v is 3 or 4, and represents the oxidation state of titanium,
a is a number varying from 0 to v,
with a molar ratio between magnesium and titanium ranging from 1/1 to 50/1;

(b) partial separation of the compound D from said mixture prepared in step (a) until a residue is obtained, solid at room temperature, wherein the D/Ti ratio ranges from 1.5 to 40,
(c) formation of a suspension of said solid residue in an inert liquid medium, preferably hydrocarbon,
(d) addition to said suspension of an organo-oxygenated protic $D_p$, in such a quantity that the molar ratio $D_p$/D ranges from 0.1 to 1.2, preferably from 0.2 to 1.2, and maintaining the mixture until the desired solid component of catalyst is formed.

According to a preferred embodiment, an inert solid I is also added to the solution in (a), in a suitable granular form, having the function of carrier and/or favouring the production of the desired morphology in the solid component of the present invention.

The solid component according to the present invention allows catalysts to be obtained, with an extremely high activity, but above all selective towards the formation of ethylene polymers and copolymers with a morphology, molecular weight distribution and the possible comonomer in the chain resulting in the complex in a combination of highly desirable properties such as: excellent rheology, with a shear sensitivity according to ASTM D1238-01, at least higher than 20, and preferably ranging from 25 to 40; a high mechanical resistance, tear resistance, tensile strength, perforation resistance; a low residual tackiness of the film. For this purpose, said solid component must be subjected to an activation process by contact and reaction with aluminum alkyls, in one or more steps, before enabling the formation of the desired polymerization catalyst.

As is customary, in accordance with the present patent application, any reference to elements, radicals, substituents, compounds or parts thereof, included in a group, also comprises reference to any mixture of elements of the group with each other.

Said solid component is preferably characterized by the following molar ratio ranges among the constituents:
Mg/Ti=1.5-10; D/Ti=3.0-8.0
Cl/Ti=10-25; $D_p$/D=0.1-2.0.
Even more preferably, said $D_p$/D ratio ranges from 0.2 to 1.0.

The titanium can be present in the solid component in oxidation state +3 or +4, or also as a mixture of compounds in the two oxidation states. The oxidation state generally depends on the preparation method used.

According to a preferred embodiment, from 10 to 90%, preferably from 20 to 70% by weight of the solid component can consist of said inert solid I, the remaining percentage being the catalytically active part. The inert solid can be conveniently included in the solid component, by introducing it, in the desired proportions, during step (a) of said preparation method.

The aprotic electron-donor compound D can be any organic compound, liquid under the process conditions of step (a), having a coordinating capacity due to the presence of a heteroatom selected from non-metallic compounds of groups 15 and 16, preferably an organic compound having from 3 to 20 carbon atoms, preferably from 4 to 10, more preferably containing at least one oxygen atom linked to a carbon atom. Compounds D are those belonging to the groups of ketones, ethers, esters, amines, amides, thio-ethers and xanthates, aliphatic or aromatic, linear or cyclic. Ethers, ketones and esters, especially cyclic ethers are preferred. Typical examples are dibutyl ether, dihexyl ether, methyl ethyl ketone, diisobutyl ketone, tetrahydrofuran, dioxane, ethyl acetate, butyrolactone or a mixture thereof.

The protic organo-oxygenated compound $D_p$, according to the present invention, is a compound capable of releasing an acid proton under medium-high basicity conditions, for example a compound with pKa ≤16. $D_p$ is preferably selected from compounds having the following formula (II):

$$P\ R\text{-}(A)_m\text{-}OH \qquad (II)$$

wherein:
- R is an aliphatic, cyclo-aliphatic or aromatic radical, optionally fluorinated, containing from 1 to 30 carbon atoms,
- A is selected from divalent groups having the formula $CR^1R^2$, CO, SCO and SO, preferably CO or $CR^1R^2$, wherein each $R^1$ and $R^2$ is independently hydrogen or an aliphatic or aromatic group having from 1 to 10 carbon atoms, more preferably CO
- m is 0 or 1.

In particular said $D_p$ is selected from alcohols and organic acids, aliphatic or aromatic, preferably aliphatic having from 2 to 10 carbon atoms. Typical examples of compounds suitable for the purpose are: ethyl alcohol, butyl alcohol, hexyl alcohol, isobutyl alcohol, amyl alcohol, benzyl alcohol, phenol, phenyl butyl alcohol, decyl alcohol, neopentyl alcohol, cyclohexyl alcohol, ethylene glycol, propylene glycol, diethylene glycol, diethylene glycol monomethyl ether, acetic acid, propionic acid, benzoic acid, hexanoic acid, 2-ethyl hexanoic acid, versatic acid (mixture of acids), phenyl butyric acid, adipic acid, succinic acid monomethyl ester, or mixtures thereof.

The process for the preparation of said solid component of catalyst comprises a first step (a) in which a mixture of the titanium compound having formula (I) and magnesium dichloride is prepared in a liquid comprising the electron donor compound D. The atomic ratio between magnesium and titanium is substantially the same as the desired solid component, i.e. ranging from 1.0 to 50. The donor compound D is introduced into the mixture in a quantities which are at least sufficient to dissolve most of the above compounds during step (a). It is generally preferable for at least 50% of said compounds to be dissolved, more preferably at least 80%, an it is even more preferable for the whole amount of magnesium chloride to be brought to solution. D/Ti molar ratios ranging from 5 to 100, are preferably used, more preferably from 10 to 50.

The titanium compound having formula (I) used for obtaining the present solid component of catalyst is suitably selected so as to be at least partially soluble in the electron-donor compound D under the process conditions adopted in step (a). The $R^3$ group is preferably selected from aliphatic alkyl or acyl groups having from 2 to 15, more preferably from 3 to 10 carbon atoms. X is preferably chlorine. Suitable titanium compounds are chlorides and bromides, for example $TiCl_4$, $TiCl_3$, $TiBr_4$, and titanium alcoholates or carboxylates. Examples of titanium tetra-alcoholates suitable for the purpose are titanium tetra-n-propylate, titanium tetra-n-butylate, titanium tetra-iso-propylate and tetra-iso-butylate. Examples of carboxylates are titanium tetra-butyrate, titanium tetra-hexanoate, titanium versatate, and mixed compounds such as titanium dichloride dihexanoate or titanium trichloride acetate.

Titanium trichloride is a solid compound less soluble in the donor compounds D, with respect to $TiCl_4$, but it has been found that it is still suitable for the formation of the desired solid component, even if it is not completely dissolved in step (a).

The magnesium chloride introduced in step (a) can be in any crystalline form, amorphous or mixed. Anhydrous magnesium chloride is preferably used. Amorphous or semi-amorphous $MgCl_2$ can be obtained with different known methods, for example by spray-drying from solutions in an alcohol, for example ethyl or butyl alcohol. The magnesium chloride thus obtained can contain a residual quantity of alcohol, normally less than 5% by weight, and is more rapidly soluble in the donor D.

According to a particular embodiment, the magnesium chloride introduced in step (a) can be at least partially formed in situ in the same step (a), by the reaction of metallic magnesium with a titanium +4 compound, preferably titanium tetrachloride, which is correspondingly reduced to Ti+3. In this case, the reaction mixture is preferably filtered before the addition of the constituents is completed in step (a). A technique of this kind is described, for example, in the above U.S. Pat. No. 5,290,745.

The order of addition of the components in the preparation of the mixture of step (a) is not relevant. Both the Ti compound and $MgCl_2$ can be optionally introduced into the mixture in the form of a solution in a suitable compound D, which may also not be the same. The donor compound D can, if necessary, also be mixed with a different inert liquid, such as, for example, un aromatic hydrocarbon, normally up to a volume ratio of 1/1.

Step (a) conveniently comprises maintaining the mixture formed as above at a temperature ranging from room temperature to the boiling point of the donor compound D, typically from 50 to 120° C., for a time varying from a few minutes to 24 hours, in order to dissolve the maximum possible quantity of said Ti and Mg compounds.

According to a particularly preferred aspect of the present invention, the mixture obtained at the end of step(a) can also comprise, in suspension, a quantity of inert solid I in granular form, which can have various functions such as, for example, improving the mechanical properties of the catalyst granule, supporting the catalytic solid in order to increase the catalytic surface effectively available, or it can act as a thickening agent in the subsequent step (b) for the preparation of the catalytic solid. Inert solids suitable for the purpose are certain polymers in granule or powder form such as polystyrene or polyester, possibly modified according to the known art. Inorganic solids such as natural or synthetic silica are preferably used, in its various varieties, also commercially available, titania, silico-aluminates, calcium carbonate, magnesium chloride (in a substantially insoluble form), or a combination thereof. Said inert solids I are preferably in granular form with average granule sizes ranging from 10 μm to 300 μm, and a narrow size distribution. A silica typically suitable for the purpose is a microspheroidal silica (size 20-100 μm) having a BET surface area ranging from 150 to 400 $m^2/g$, a total porosity equal or higher than 80% and an average pore radius of 50 to 200 Å.

The quantity of inert solid added to the mixture in (a) is generally selected by normal experts on the basis of the role of the inert solid in the catalyst or in its preparation. Such quantities are conveniently used as to obtain at the end of the preparation a content of inert product ranging from 10 to 90%, preferably from 20 to 70%, by weight with respect to the total weight of the solid component. In particular, if the inert solid is mainly introduced as a thickening agent, such quantities as to obtain a final content of inert product of 25 to 50% by weight, are preferred. If the inert solid is mainly used as a carrier, the quantity in the end-product preferably varies from 40 to 60% by weight.

The procedure for introducing the inert solid I in the mixture of step (a), is not critical. The solid can be added to the donor D before the other compounds, or after their dissolution and possible filtration of the solution. In a preferred embodiment, the inert solid, particularly silica, is put in suspension in a part of the compound D and optionally heated for a few minutes under stirring, before being added to the mixture containing the Ti and Mg compounds and the remaining quantity of D.

At the end of step (a), the mixture obtained is separated in step (b) from most of the electron-donor compound D, until the desired D/Ti molar ratio is obtained, by means of any of the techniques of the art suitable for the purpose, for example by precipitation by the addition of an excess of a hydrocarbon compound, such as hexane or heptane, or by evaporation. A residue is obtained at the end, either solid or with a pasty consistency.

Any evaporation technique can be used for the purpose, such as flash evaporation, distillation, current evaporation, spray-drying, the latter being preferred. In an embodiment, evaporation by means of spray-drying comprises heating the mixture (solution or suspension) to a temperature close to boiling point and forcing it through a nozzle into a chamber operating below atmospheric pressure, or in which an inert gas is circulated. In this way, granules are obtained, having the desired size, generally with a diameter ranging from about 10 to about 200 µm.

In the solid obtained at the end of said step (b), essentially all the titanium is adsorbed and physically dispersed on the magnesium chloride.

In the subsequent step (c), the residue of step (b) is added to an inert liquid in which the solid part is essentially insoluble. Suitable inert liquids are generally hydrocarbons, optionally halogenated, for example fluorinated, in particular aliphatic, cyclic or linear hydrocarbons such as hexane, cyclohexane, heptane, decane, etc.

If an inert liquid has been introduced in step (a), it can be evaporated together with the compound D, or, especially if it is higher boiling than D, it can partly remain in the mixture with the solid residue, thus directly forming the suspension obtained at the end of step (c). The quantity of liquid in step (c) is not critical but the solid/liquid ratio can conveniently range from 10 to 100 g/l.

It has been found that the donor compound D remains stably bound to the above solid residue, under normal temperature conditions, and is not removed in significant quantities by washing with an inert liquid such as that used for the suspension in step (c).

According to a particular aspect of the present invention, the solid residue obtained in the above step (b), or also the suspension in the inert liquid of step (c), can be obtained as described in U.S. Pat. No. 4,302,566, U.S. Pat. No. 4,354,009 or U.S. Pat. No. 5,290,745, whose contents are incorporated herein as reference, in particular in relation to the preparation of the so-called "precursor".

Consequently, the solid component according to the present invention can also be obtained by modifying in accordance with said step (d) or said steps (c) and (d) in succession, a solid catalyst precursor, comprising titanium, magnesium, chlorine, an aprotic electron-donor compound D and optionally an inert solid compound I, in which the constituents are in the following molar ratios:
Mg/Ti=1-50; D/Ti=2.0-20; Cl/Ti=6-100;
preferably
Mg/Ti=1.5-10; D/Ti=4.0-12; Cl/Ti=10-30;
and said inert solid I is in a quantity ranging from 0 to 95%, preferably from 20 to 60% by weight with respect to the total weight of the precursor.

In step (d) of the process according to the present invention, a protic compound $D_p$ containing at least one hydrogen atom with acid or weakly acid characteristics, as defined above, is added to the suspension obtained according to said step (c). Said compound $D_p$ is added in such a quantity that the molar ratio with the electron-donor compound ranges from 0.1 to 1.2, preferably from 0.2 to 1.2, even more preferably from 0.3 to 0.7.

The organo-oxygenated protic compound $D_p$ reacts with the solid present in the suspension partly substituting the donor D until equilibrium is reached, i.e. when the $D_p$/D ratio in the liquid remains constant. The compound $D_p$ is preferably added in a molar quantity equal to or lower than the quantity of D effectively bound to the solid obtained in step (c), or in any case to the solid precursor. The reaction is conveniently carried out by heating the mixture to a value ranging from 40 to 100° C., more preferably from 60 to 80° C., for a period varying from 5 minutes to 5 hours. The reaction generally reaches equilibrium in times of less than 60 minutes.

In a preferred embodiment, the protic compound $D_p$ is added to the suspension at room temperature, and the suspension is then heated to the desired temperature for 20-40 minutes, under stirring.

Said solid component of catalyst preferably consists of at least 90% by weight, more preferably at least 95% by weight of said components of Ti, Mg, Cl, D, $D_p$ and optionally the inert solid. If the titanium and magnesium compounds introduced in step (a) are essentially chlorides, the solid component obtained even more preferably substantially consists of said components. If, on the other hand, carboxylates or alcoholates are at least partially used in step (a), the oxygenated protic compound $D_p$ in the end-product can also represent a mixture of compounds different from the compound having formula (II) introduced in step (d), due to exchange with said carboxylates or alcoholates. In any case, however, the beneficial effects due to the presence of said organo-oxygenated protic compound as a whole are not modified.

All of the above operations for the preparation of the solid component of catalyst are conveniently carried out in a controlled and inert atmosphere, for example of nitrogen or argon, depending on the sensitivity of aluminum alkyls and solid component of catalyst to air and humidity.

The quantity of titanium contained in the solid component of the present invention preferably does not exceed 10% by weight, and more preferably ranges from 1 to 5% by weight. Titanium contents higher than 10% by weight do not offer any further advantage in terms of catalytic activity, presumably due to the fact that the additional titanium is present in the solid in an inactive form or is unavailable to interact with the olefin to be polymerized.

The solid component of catalyst thus obtained can be separated from the liquid by means of the known liquid/solid separation means suitable for the purpose, such as decanting, filtration, centrifugation, or a combination of these, with the exception of evaporation of the solvent. It is subsequently washed with a hydrocarbon solvent and optionally dried, or maintained in suspension in said solvent.

The solid component of catalyst thus obtained forms an excellent catalyst for the (co)polymerization of α-olefins combined with a suitable activator and/or co-catalyst, consisting of an alkylic organometallic compound of aluminum, preferably an aluminum alkyl or an aluminum alkyl halide.

In particular, in a preferred embodiment of the present invention, said solid component is first activated by contact and reaction with a suitable quantity of an aluminum alkyl or alkyl chloride and the activated solid component subsequently forms the final catalyst by contact and reaction with a suitable quantity of aluminum trialkyl.

According to this preferred embodiment, the solid component is put in contact and reacted, in a suitable inert liquid medium, with an aluminum alkyl or alkyl chloride represented by means of the following general formula (III):

$$AlR'_nX_{(3-n)} \qquad (III)$$

wherein: R' is a linear or branched alkyl radical containing from 1 to 20 carbon atoms, X is selected from H and Cl, preferably Cl, and "n" is a decimal number having values ranging from 1 to 3, preferably from 2 to 3;
in such a quantity that the $Al/(D+D_p)$ ratio ranges from 0.1 to 1.5, preferably from 0.2 to 1.3, even more preferably from 0.3 to 1.0.

Aluminum alkyl chlorides having formula (III) are known and widely used in the field of the polymerization of olefins. Preferred aluminum alkyl chlorides are compounds having formula (III) wherein R' is a linear or branched aliphatic radical, having from 2 to 8 carbon atoms. Typical examples of these compounds are ethyl aluminum dichloride, diethyl aluminum chloride, ethyl aluminum sesquichloride, isobutyl aluminum dichloride, dioctyl aluminum chloride. Alkyl aluminum chlorides having non-integer decimal values of "n" can be obtained, according to the known art, by mixing, in suitable proportions, aluminum chlorides and aluminum trialkyls and/or the respective mixed alkyl chlorides having "n" equal to 1 and 2.

Aluminum alkyls included in said formula (III) are also known, many of which are products available on the market. Typical examples of these aluminum alkyls are aluminum trialkyl, such as aluminum trimethyl, aluminum triethyl, aluminum triisobutyl, aluminum tributyl, aluminum trihexyl, aluminum trioctyl, and aluminum alkyl hydrides such as diethyl aluminum hydride, dibutyl aluminum hydride, dioctyl aluminum hydride, butyl aluminum dihydride.

The organometallic compound of aluminum having formula (III) can be added as such, or in the form of a solution in an inert organic solvent selected from hydrocarbons liquid at room temperature, for example hexane, heptane, toluene, or also in supported form on an inert solid analogous to the above solid I.

According to a preferred aspect of the present invention, especially for a subsequent use in the production of LLDPE, the activation phase of said solid component can be effectively carried out in two steps with two different organometallic compounds of Al having formula (III). In the first step it is reacted with aluminum trialkyl (n=3 in formula (III)), whereas in the second step it is reacted with an aluminum dialkyl chloride (n=2, X=Cl, in formula (III)), in such a quantity that the overall molar ratio $Al/(D+D_p)$ ranges from 0.1 to 1.3, preferably from 0.4 to 1.1. The solid component is normally not separated between the first and second step. Also at the end of the activation it is preferable to leave the activated component in suspension in the liquid reaction medium possibly containing the aluminum alkyl or non-reacted alkyl halide.

In another preferred aspect, in said first step the $AlR_3/(D+D_p)$ ratio ranges from 0.1 to 0.4, and in the second step the $AlR_2Cl/(D+D_p)$ ratio ranges from 0.2 to 0.7.

The activated catalyst component, obtained with the above process contains at least 20% of titanium in reduced form (oxidation state +3) with respect to the total quantity of titanium. The titanium in reduced form is preferably at least 50% of the total titanium, more preferably 80%. The quantity of titanium +3 generally increases with an increase in the quantity of aluminum alkyl having formula (III) reacted with the solid component, and can be consequently regulated on the basis of the experience of the expert in the art.

The solid component, both in activated and non-activated form, is capable of forming a catalyst for the (co)polymerization of α-olefins, and specifically ethylene, by contact and reaction with a suitable co-catalyst.

Suitable co-catalysts which can be used in a combination with the solid component activated as described above, are those normally used in the art for the preparation of Ziegler-Natta catalysts, particularly comprising a hydrocarbyl compound of a metal selected from Al, Ga, Mg, Zn and Li, preferably aluminum, more preferably aluminum trialkyls containing from 1 to 10, even more preferably from 1 to 5, carbon atoms in each alkyl group. Among these, aluminum trimethyl, aluminum triethyl, aluminum tri-n-butyl, aluminum triisobutyl, are specially preferred.

In the catalysts of the present invention, the atomic ratio between metal (in the co-catalyst) and titanium (in the solid component of catalyst) generally varies from 10:1 to 500:1 and preferably from 50:1 to 200:1, in relation to the particular polymerization system adopted and the process parameters. If the solid component is not activated, it is preferable to use a metal/Ti ratio of at least 100 and up to 400, whereas the activated component is preferably treated with an atomic ratio metal/Ti ranging from 50:1 to 200:1.

Said catalyst is formed according to the known techniques, by contact between the solid component and co-catalyst, by reacting the components as such or in a suitable liquid medium, usually a hydrocarbon, preferably the same in which the activated solid component was obtained, in order to avoid the separation of the suspension from the liquid. The concentration of co-catalyst in the liquid medium is selected on the basis of normal practice and generally ranges from 0.1 to 1.0 moles/L. The temperature at which the catalyst is prepared, is not particularly critical, and is preferably within the range of 0° C. to the operating temperature of the catalyst in the polymerization process, i.e. up to a temperature of 120° C. and even over.

The formation of the catalyst is normally extremely rapid already at room temperature. The contact between the components is usually selected from 5 seconds to 30 minutes, depending on the temperature, before starting the polymerization. According to the operating requirements, the catalyst can be formed in situ in the polymerization reactor, or fed to the reactor after being preformed in a suitable apparatus. In particular, in the case of polymerization in gas phase, especially with the fluid bed technique, it is preferable to feed the activated solid component to the reactor separately from the solution of co-catalyst, forming the catalyst directly in the polymerization environment. In this case, the contact time is determined by the process conditions of the fluid bed and is within the range of a few seconds to approximately one minute.

The non-activated solid component can also be used for the preparation of polymerization catalysts by means of contact and reaction with a suitable quantity of co-catalyst, or an aluminum trialkyl as specified above. In this case, the activation takes place contemporaneously with the formation of the catalyst, using the same aluminum alkyl, but it has been found in practice that a catalyst with the same characteristics as that produced in two separate steps, as described above, is not necessarily obtained, even if the components used are identical. It has been found that the polymerization catalyst prepared without the intermediate activation step, which represents an object of the present invention, is especially suitable for polymerization processes in suspension.

A further object of the present invention relates to a process for the (co)polymerization of ethylene, i.e. for the polymerization of ethylene to give linear polyethylene and for the copolymerization of ethylene with propylene or other α-olefins, preferably having from 4 to 10 carbon atoms, which comprises reacting ethylene and optionally at least one α-olefin, under suitable polymerization conditions, preferably in gas phase, in the presence of the above catalyst according to the present invention. The quantity of catalyst is generally selected by an expert in the field in order to allow the process temperature to be controlled, i.e. so that the polymerization is not excessively exothermic and does not cause the softening and melting of the polymer granules. The amount of catalyst introduced into the reactor is preferably selected so that the titanium concentration ranges from 1 to 5 ppm by weight with respect to the consolidated production.

Typical and non-limiting examples of polymerization process conditions in gas phase, suitable for the use of the catalyst according to the present invention, are described, with reference to different catalysts, in the patents mentioned above, in particular U.S. Pat. No. 4,302,566 and U.S. Pat. No. 4,293,673.

A polymerization process in gas phase according to the present invention is conveniently carried out according to the known fluid bed technique, by putting a gaseous stream of the monomer(s) in contact with a sufficient quantity of the catalyst of the present invention, at a temperature ranging from 70 to 115° C., depending on the density of the (co)polymer to be obtained (usually ranging for LLDPE from 0.90 to 0.95), and at a pressure ranging from 500 to 1000 kPa.

The feeding stream of the monomers, to which that of the recycled gases, from 30 to 50 times higher in volume, is added, is sent to the bottom of the reactor through a distribution plate so as to uniformly sustain, with efficient stirring, the suspended catalyst bed and polymeric particulate in formation. A part of said stream, or a secondary stream is preferably in liquid form with the function of cooling, possibly by means of the presence of a low-boiling inert liquid, for example hexane, to maintain the desired temperature in the fluid bed.

The catalyst is preferably formed in situ, by introduction in the fluid bed, through a stream of inert gas, of the activated solid component in suspension, and co-catalyst, where it enters into contact with the monomers coming from the bottom of the reactor. The particle of polymer englobes the catalyst itself and grows to the desired dimensions by contact with the monomers in gas phase of the fluid bed.

Hydrogen or other known compounds suitable as chain transfer agents can also be introduced at a suitable height of the reactor, at times in the catalyst stream itself, in order to regulate the average molecular weight to the desired value. Furthermore, according to the gas phase polymerization technique in use, an inert gas is also present in the gaseous mixture, usually nitrogen, in an amount of 30% in volume.

The polymer thus produced is removed in continuous in the lower area of the fluid bed and sent to the recovery section. The catalyst is deactivated and the residual gases separated from the polymer by means of a gaseous stream in a suitable flushing column. Most of the un-reacted gas rises to the section of the reactor above the fluid bed and is then sucked into a compressor and sent back to the reactor as recycled product.

In accordance with what is specified above, the catalyst according to the present invention can be used with excellent results in normal industrial polymerization processes of ethylene to give linear polyethylene and in the copolymerization of ethylene with propylene or higher α-olefins, preferably having from 4 to 10 carbon atoms, to give copolymers having different characteristics in relation to the specific polymerization conditions and the quantity and structure of the α-olefin itself. Linear polyethylenes can be obtained, for example, with densities ranging from 0.890 to 0.970 g/cm$^3$, preferably from 0.900 to 0.950 g/cm$^3$, and with weight average molecular weights $M_w$, ranging from 20,000 to 500,000. α-olefins preferably used in the copolymerization of ethylene for the production of linear low or medium density polyethylene (known with the abbreviations VLDPE or LLDPE), are 1-butene, 1-hexene and 1-octene. The α-olefin/ethylene molar ratio is selected, once all the other conditions have been determined, on the basis of the desired content of comonomer in the copolymer, and usually ranges from 0.005 to 2.0, preferably from 0.1 to 1.0, even more preferably, from 0.1 to 0.4.

The (co)polymers of ethylene thus obtained have excellent mechanical and rheological characteristics, comparable to or even higher than those of the best commercial polyethylenes having a similar composition and density, but have a much lower tackiness, expressed as gluing capacity, usually lower than 260 cN, preferably ranging from 130 to 200 cN, whereas the polyethylenes obtained with analogous processes, but in the presence of traditional catalysts, produced from solid components containing only one type of electron-donor compound, have gluing capacity values higher than 300 cN.

According to a particular embodiment of the present invention, the said process for the copolymerization of ethylene can be advantageously used for producing linear polyethylene having a low to ultra-low density, namely below 0.915 g/ml, preferably ranging from 0.900 to 0.915 g/ml, more preferably from 0.905 to 0.915 g/ml, by polymerization in gas phase, of a gaseous mixture including ethylene and at least one alpha-olefin having from 4 to 10 carbon atoms, in the presence of the polymerization catalyst of the present invention. Preferably, the polymerization process is carried out at a temperature ranging from 70 to 95° C., depending on the density of the (co)polymer to be obtained, and at a pressure ranging from 300 to 3000 kPa, more preferably from 500 to 1000 kPa. The alpha-olefins preferably used for the production of such linear low or very low density polyethylene (indicated as LLDPE and VLDPE), are 1-butene, 1-hexene, 1-octene and mixtures of said co-monomers, for example 1-hexene/1-butene in a molar ratio of 2/1. In some cases, polypropylene can also be suitably reacted, in a molar ratio, with respect to ethylene, ranging from 0.1-0.3. The alpha-olefin/ethylene molar ratio is selected by the technical expert, once all the other conditions have been chosen, so as to obtain, in the end, the desired co-monomer content in the copolymer, and preferably ranges from 0.1 to 0.80, more preferably from 0.1 to 0.4. In order to achieve the best performances of the polyethylene thus obtained, the use of alpha-olefin/ethylene ratios which increase (within the above-mentioned ranges) with an increase in the molecular weight of the copolymer, has been found to be convenient.

According to this embodiment, linear polyethylene is obtained, having a density lower than 0.915 g/ml, a weight average molecular weight $M_w$ ranging from 20,000 to 500,000, and an MWD distribution ($M_w/M_n$) ranging from 2 to 7, preferably from 2.5 to 4. These ethylene copolymers show a morphology, molecular weight distribution and distribution of the comonomer in the chain which are such as to provide, in the complex, a combination of highly desirable properties such as: excellent rheology, with a shear sensitivity (usually SS, in short) according to ASTM D1238-01, at least higher than 20, and preferably ranging from 25 to 40; a high mechanical resistance, tear resistance, tensile strength, perforation resistance; a low residual tackiness in film and granular form. In particular the reduced tackiness allows control of the gas-phase process in such a way as to avoid any undesired increase of the weight of the fluid bed and risk of collapse.

The present invention is particularly illustrated in its numerous aspects by the following examples which are provided for solely illustrative purposes, and which should in no way be considered as limiting the scope of the invention itself.

EXAMPLES

The following analytical and characterization methods were used.

Melt Flow Index

The Melt Flow Index (MFI), correlated to the weight average molecular weight of the polymer, measured according to the standard ASTM-D 1238 E technique. The MFI is indicated, measured with a weight of 2.16 kg at 190° C., expressed as grams of polymer melted in 10 minutes (g/10 min).

Shear Sensitivity, (SS)

Calculated as a ratio between the MFI at 2.16 kg and the MFI at 21.6 kg, both measured according to the above standard technique. This parameter is known to be correlated with the molecular weight distribution.

Density

Determined according to the method ASTM D1505-98.

Residual Tackiness

Determined as a measurement of the gluing capacity according to the method ASTM D5458-95

Dart

Determined according to the method ASTM D 1709-01 (Test method B).

Perforation Resistance

Determined according to the method ASTM D5748-95

Elmendorf

Determined according to the method ASTM D1922-00

Reagents and Materials

The following reagents and materials were used in particular in the practical embodiments object of the following examples. Unless specified, the products were used as received from the supplier.

Magnesium chloride ALDRICH ($MgCl_2$, powder, purity >99.9%); titanium trichloride ALDRICH ($TiCl_3$ purity >99.99%), 2-ethyl-hexanoic acid (purity 99.00%) produced by BASF; 1-butanol ALDRICH (purity 99.8%); Tetrahydrofuran (THF) ALDRICH (purity 99.9%); Diethyl Mono Chloro Aluminum (DEAC) (purity 99.90%); Tri-n-hexyl Aluminum (purity 99.90%), Triethyl Aluminum (purity 99.90%), Trimethyl Aluminum (purity 99.90%), CROMPTON products; n-heptane, produced by Synthesis-(PR) under the name of SYNTSOL LP 7, purified by passage over molecular sieves.

Example 1

30 ml of a suspension of heptane containing 1.0 g of a solid precursor in powder form, prepared according to the method described in U.S. Pat. No. 5,290,745 whose contents are integrally included herein as reference, particularly example 1, paragraphs (a) and (b) for the preparation of the solid precursor by the spray-drying technique, are charged into a 200 ml glass vessel, equipped with mechanical stirring and placed under inert atmosphere of nitrogen. The precursor contained 660 mg of catalytically active component comprising 0.51 mmoles of Ti, 2.82 mmoles of Mg, 7.17 mmoles of Cl, 4.34 mmoles of tetrahydrofuran (THF; electron-donor compound D) and 340 mg of silica having the following characteristics: average diameter 0.1 microns, porosity of 0.25 cc/g, surface area by means of B.E.T. 25 $m^2/g$.

A further 70 ml of heptane are added, together with 0.2 ml of 1-butanol (2.19 mmoles), and the suspension is left under stirring for 20 minutes at room temperature. The temperature is then brought to 70° C. for 25 minutes, and the mixture is subsequently cooled again to room temperature.

A suspension containing 1025 mg of solid component of catalyst comprising the following constituents, was obtained: T±0.51 mmoles; Mg 2.82 mmoles; Cl 7.17 mmoles; silica 340 mg; THF 2.01 mmoles; BuOH 1.65 mmoles, with a molar ratio BuOH/THF in the solid equal to 0.826. It is not separated from the suspension liquid, but is directly subjected to activation by means of the treatment described in the following example.

Example 2

The solid component obtained in example 1 is activated by means of contact and reaction with a suitable quantity of an aluminum alkyl in two subsequent steps.

1.3 ml of tri-n-hexyl aluminum 1 M in heptane (THA; 1.3 mmoles), diluted in a further 10 ml approximately of heptane (THA/(BuOH+THF) ratio=0.355), were added to 100 ml of the suspension obtained in example 1, containing 1000 mg of solid component, introduced into a glass container under nitrogen. The whole mixture is left under stirring at room temperature for about 60 minutes, and 2.17 ml of diethyl aluminum chloride 1 M in heptane (DEAC; 2.17 mmoles; DEAC/(BuOH+THF) ratio=0.593), are then added at the same temperature, leaving the mixture under stirring for 60 minutes. A suspension of the activated solid component is obtained, having a titanium concentration of 4.5 mmoles/1, which is directly introduced into the polymerization reactor for the preparation of the desired polyethylene.

Example 3

The procedure of the previous example 1 is exactly repeated, but 0.35 ml of pure 2-ethyl-hexanoic acid (AEE; 2.19 mmoles) are added instead of n-butanol, as protic compound $D_p$. At the end, 1064 mg of solid component of catalyst are obtained, in a heptane suspension, comprising: T±0.50 mmoles; Mg 2.82 mmoles; Cl 7.17 mmoles; silica 339.88 mg; THF 3.39 mmoles; AEE 0.92 mmoles, with a molar ratio on the solid AEE/THF=0.272.

Example 4

The solid component of catalyst obtained in the previous example 3 is activated with the same procedure described in example 2, but using the following quantities of reagents:

1.3 ml of tri-n-hexyl aluminum 1M in heptane (1.3 mmoles) diluted in about 10 ml of heptane (THA/(AEE+THF) ratio=0.302), 2.17 ml of diethyl aluminum chloride 1 M (DEAC/(AEE+THF) ratio=0.503).

At the end a suspension is obtained comprising a concentration of titanium equal to 4.4 mmoles/liter.

Example 5

The procedure of the previous example 1 is exactly repeated, using the same reagents in the same quantities, with the only difference that 0.1 ml of butanol (1.095 mmoles) are added to the solid precursor suspension, instead of 0.2 ml. 952 mg of a solid component of catalyst are obtained in the end, in a suspension of heptane, comprising: Ti 0.50 mmoles; Mg 2.82 mmoles; Cl 7.17 mmoles; silica 340 mg; THF 2.83 mmoles, BuOH 0.825 mmoles, with a molar ratio BuOH/THF in the solid matter equal to 0.291.

Example 6

The solid component, obtained as described in previous example 5, is activated using a procedure similar to that indicated in the previous example 2.

0.87 ml of tri-n-hexyl aluminum 1 M in heptane (0.87 mmoles), diluted in a further 10 ml of heptane (THA/(BuOH+THF) ratio=0.238) were added to 100 ml of the suspension obtained in example 5, containing 952 mg of solid component, introduced in a glass container under nitrogen. The mixture is left under stirring at room temperature for about 60 minutes and, at the same temperature, 2.17 ml of diethyl aluminum chloride 1 M in heptane (DEAC: 2.17 mmoles; DEAC/(BuOH+THF) ratio=0.594) are added under continual stirring for about 60 minutes. A suspension of the activated solid component is obtained, with a titanium concentration of 4.5 mmoles/l, which is used as such in the polymerization reaction.

Examples 7-14

Polymerization of Ethylene

Various copolymerization tests of ethylene ($C_2$) were carried out with 1-hexene ($C_6$), in a gas-phase fluid-bed reactor, having a cylindrical geometry, similar to the reactor illustrated and described in the above-mentioned U.S. Pat. No. 4,302,565, U.S. Pat. No. 4,302,566, U.S. Pat. No. 4,303,771, whose contents are integrally incorporated herein as reference, with a total internal volume of 2.33 m$^3$. The reaction was carried out at an average temperature of 84° C. A gaseous stream containing ethylene and 1-hexene is introduced from below by means of a distribution plate with a gas surface rate of about 0.50 m/s. The ethylene/1-hexene ratio is fixed as indicated in Table 1 below for each test.

Table 1 also indicates the fluid bed conditions (weight, level and residence time expressed in terms of BTO, bed turnover).

The suspension of the activated solid component, prepared as described in the previous examples 2 or 4, is introduced laterally into the reactor together with a solution of co-catalyst, consisting of aluminum trimethyl (TMA) or aluminum triethyl (TEA) at 5% by weight in hexane, with a flow-rate which is such as to respect the atomic ratio Al/Ti according to what is specified in Table 1.

The catalyst in its final activated form is formed by reaction of the activated solid component and the co-catalyst in situ directly in the fluid bed.

The polymer obtained in the form of a grossly spherical particulate having the density and average diameter (APS) indicated in Table 1, is continuously removed in the lower part of the reactor, subjected to deactivation of the catalyst, separation of the non-reacted monomers and sent to an extrusion-granulation apparatus to obtain the product in granular form, suitable for transportation and subsequent transformation. Table 1 indicates the catalyst activity (in kg of polymer per gram of Ti in the catalyst) for each test.

A part of the polymer is characterized for the rheological properties (Melt Index MI and Shear Stress SS) and the density. A part is subjected to filming using a blow extrusion apparatus Mod. UNION TR60 with a Bielloni single-layer cast line to obtain films suitable for measuring the mechanical properties (resistance to perforation, dart and Elmendorf test (MD)). A part of the film is measured to determine the gluing capacity according to the method ASTM D5458-95 which is correlated to the residual tackiness.

Examples 15 and 16

Comparative

Two polymerization tests were effected with the same reactor and under analogous conditions to those described in the previous examples 7 to 14, using a catalyst obtained starting from the non-modified solid component, prepared according to Example 1 of the above U.S. Pat. No. 5,290,745, but activated repeating the process of the previous example 2. The conditions adopted and characteristics of the polymers obtained are summarized in Tables 1 and 2 below.

On examining the data in Table 2, the surprising reduction in the gluing capacity of the polyethylene can be immediately observed (always lower than 190 cN) in all the examples according to the invention, with respect to the values of 327 and 350 cN, characteristic of polyethylenes obtained with the process based on traditional catalysts. All the other characteristics are, on the contrary, in line with the satisfactory values of traditional polyethylenes.

TABLE 1

| | Polymerization process | | | | | | | | | |
|---|---|---|---|---|---|---|---|---|---|---|
| | Example | | | | | | | | | |
| | 7 | 8 | 9 | 10 | 11 | 12 | 13 | 14 | 15 (Comp) | 16 (Comp) |
| Solid component of catalyst (Ex. Nr.) | 2 | 4 | 4 | 4 | 4 | 4 | 2 | 2 | — | — |
| Pressure (kPa) | 605 | 708 | 771 | 779 | 833 | 790 | 725 | 745 | 690 | 748 |
| Aluminum alkyl | TMA | TEA | TEA | TMA | TMA | TMA | TMA | TMA | TEA | TMA |
| Al/Ti (atom/atom) | 91 | 95 | 85 | 79 | 110 | 46 | 75 | 73 | 141.2 | 93.5 |

TABLE 1-continued

Polymerization process

| | Example | | | | | | | | | |
|---|---|---|---|---|---|---|---|---|---|---|
| | 7 | 8 | 9 | 10 | 11 | 12 | 13 | 14 | 15 (Comp) | 16 (Comp) |
| $H_2$/ethylene (mol/mol) | 0.225 | 0.199 | 0.172 | 0.182 | 0.184 | 0.202 | 0.196 | 0.184 | 0.185 | 0.22 |
| Hexene/ethylene (mol/mol) | 0.149 | 0.177 | 0.163 | 0.151 | 0.154 | 0.161 | 0.145 | 0.138 | 0.140 | 0.153 |
| Bed weight (kg) | 58 | 56 | 55 | 54 | 53 | 52 | 54 | 54 | 57.6 | 54.1 |
| Bed level (m) | 2.1 | 2.2 | 2.2 | 2.2 | 2.3 | 2.1 | 2.1 | 2.0 | 2.1 | 1.99 |
| BTO (hr) | 3.0 | 3.0 | 3.1 | 3.2 | 2.8 | 2.8 | 3.0 | 3.0 | 2.5 | 2.7 |
| Production (kg/hr) | 19.1 | 19.0 | 17.7 | 17.0 | 17.0 | 19.0 | 19.0 | 18.0 | 22.7 | 20 |
| Activity ($kg_{PE}/g_{Ti}$) | 1163 | 1170 | 1053 | 1015 | 1053 | 948 | 1068 | 1060 | 1290 | 910 |

TABLE 2

Polyethylene characterization

| | Example | | | | | | | | | |
|---|---|---|---|---|---|---|---|---|---|---|
| | 7 | 8 | 9 | 10 | 11 | 12 | 13 | 14 | 15 (comp) | 16 (comp) |
| MI (g/10 min) | 2.55 | 2.67 | 2.56 | 2.63 | 2.46 | 2.48 | 2.60 | 2.55 | 2.83 | 2.51 |
| Density (g/cm$^3$) | 0.9171 | 0.9175 | 0.9181 | 0.9167 | 0.9177 | 0.9173 | 0.9171 | 0.9182 | 0.9192 | 0.9169 |
| S.S. | 31.0 | 29.6 | 30.6 | 30.0 | 31.2 | 29.7 | 30.5 | 30.0 | 31.0 | 29.0 |
| Bulk density (g/cm$^3$) | 0.297 | 0.303 | 0.310 | 0.284 | 0.274 | 0.276 | 0.308 | 0.325 | 0.331 | 0.352 |
| APS (μm) | 566 | 620 | 617 | 651 | 643 | 670 | 536 | 540 | 513 | 563 |
| Gluing capacity (cN) | 183 | 172 | 158 | 181 | 183 | 166 | 176 | 169 | 327 | 350 |
| Perforation (N/mm) | 1461 | 1461 | 1356 | 1501 | 1776 | 1642 | 1450 | 1536 | 1387 | 1450 |
| Dart (J/mm) | 35 | 43 | 41 | 50 | 33 | 50 | 44 | 42 | 33 | 37 |
| Elmendorf MD (N/mm) | 130 | 121 | 103 | 101 | 106 | 110 | 134 | 136 | 132 | 170 |

Examples 17-23

(Co)Polymerization of Ethylene

Various copolymerization tests of ethylene ($C_2$) were carried out with 1-hexene ($C_6$), in the same gas-phase fluid-bed reactor as described in previous example 7. The reaction was carried out at an average temperature of 84° C. A gaseous stream containing ethylene and 1-hexene is introduced from below by means of a distribution plate with a gas surface rate of about 0.50 m/s. The ethylene/1-hexene ratio is fixed as indicated in Table 3 below for each test. Table 3 also indicates the fluid bed conditions (weight, level and residence time expressed in terms of BTO, bed turn-over).

The suspension of activated solid component, prepared as described in the previous examples 2 or 6, is introduced laterally into the reactor together with a solution of co-catalyst, consisting of aluminum trimethyl (TMA) or aluminum triethyl (TEA) at 5% by weight in hexane, with a flow-rate which is such as to respect the atomic ratio Al/Ti according to what is specified in Table 3.

The catalyst in its final activated form is formed by reaction of the activated solid component and the co-catalyst in situ directly in the fluid bed.

The polymer obtained in the form of a grossly spherical particulate having the density and average diameter (APS) indicated in Table 3, is continuously removed in the lower part of the reactor, subjected to deactivation of the catalyst, separation of the non-reacted monomers and sent to an extrusion-granulation apparatus to obtain the product in granular form, suitable for transportation and subsequent transformation. Table 3 indicates the catalyst activity (in kg of polymer per gram of Ti in the catalyst) for each test.

A part of the polymer is characterized for the rheological properties (Melt Index MI and Shear Stress SS) and the density. A part is subjected to filming using a blow extrusion apparatus Mod. UNION TR60 with a Bielloni single-layer cast line to obtain films suitable for measuring the mechanical properties (resistance to perforation and dart).

Example 24

Comparative

A polymerization test was effected in the same reactor and under analogous conditions as those described in the previous example 17, using a catalyst obtained starting from the non-modified solid component, prepared according to example 1 of the above-mentioned U.S. Pat. No. 5,290,745, and activated by repeating the process of the previous example 2. It was impossible, however, to complete the polymerization test due to the increasing heaviness of the bed, which, after a few minutes of production, could no longer be sustained by the gas stream. This result can be attributed to the excessive tackiness of the copolymer thus produced, which tends to clot in the polymerization reactor itself and is difficult to remove. The distinct technical progress represented by the process of the present invention, is therefore evident.

TABLE 3

Polymerization process and characterization of products.

| | Example | | | | | | | |
|---|---|---|---|---|---|---|---|---|
| | 17 | 18 | 19 | 20 | 21 | 22 | 23 | 24 (comp.) |
| Activat. solid component (preparative ex. number) | 2 | 2 | 2 | 2 | 6 | 6 | 6 | — |
| Pressure (kPa) | 516 | 553 | 676 | 673 | 535 | 550 | 520 | 535 |
| Temperature (° C.) | 80 | 83 | 82 | 84 | 80 | 83 | 84 | 80 |
| TEA/Ti (mol./atom) | 61 | 61 | 70 | 60 | 48 | 47 | 45 | 63 |
| $H_2$/ethylene (mol/mol) | 0.102 | 0.135 | 0.205 | 0.216 | 0.108 | 0.225 | 0.170 | 0.112 |
| 1-hexene/ethylene (mol/mol) | — | — | 0.163 | 0.149 | — | 0.145 | — | — |
| 1-butene/ethylene (mol/mol) | 0.227 | 0.186 | — | — | 0.215 | — | 0.315 | 0.215 |
| Bed weight (kg) | 49 | 50 | 48 | 52 | 54 | 56 | 56 | >60 |
| BTO (h) | 2.3 | 2.4 | 2.3 | 2.4 | 2.6 | 2.7 | 2.6 | n.d. |
| Production (kg/h) | 20.8 | 20.8 | 21 | 21.5 | 20.6 | 20.4 | 20 | n.d. |
| Activity ($kg_{PE}/g_{Ti}$) | 1080 | 1138 | 1054 | 1043 | 953 | 919 | 940 | n.d. |
| Density (g/cm$^3$) | 0.908 | 0.913 | 0.913 | 0.914 | 0.909 | 0.913 | 0.913 | n.d. |
| Apparent density (g/cm$^3$) | 0.269 | 0.270 | 0.274 | 0.298 | 0.300 | 0.340 | 0.302 | n.d. |
| MI (g/10 min) | 1.0 | 1.17 | 2.97 | 3.43 | 0.98 | 3.08 | 1.3 | n.d. |
| S.S. | 29.1 | 30.2 | 31.4 | 32 | 30.1 | 28.7 | 29.9 | n.d. |
| Perforation (N/mm) | 1048 | 1342 | 1337 | 1298 | 1050 | 1320 | 1315 | n.d. |
| Dart (J/mm) | 98 | 63 | 67 | 65 | 97 | 68 | 61 | n.d. | n.d.: not determined

The invention claimed is:

1. A process for preparation of a solid component comprising titanium, magnesium, chlorine, an organo-oxygenated protic compound $D_p$ which is selected from the group consisting of alcohols and organic acids having from 2 to 10 carbon atoms, and a neutral electron-donor aprotic compound D which is an ether having from 3 to 10 carbon atoms, in the following molar ratio ranges:

Mg/Ti=1.0-50; D/Ti=1.0-15;
Cl/Ti=6.0-100; $D_p$/D=0.2 to 1.0,
and additionally comprising an inert granular solid, in a quantity ranging from 10 to 90% by weight with respect to the total weight of the solid component,
the process comprising in succession: (a) forming of a mixture in aprotic electron-donor compound D, of a magnesium chloride and titanium trichloride until at least 50% of said components are dissolved,
with a molar ratio between magnesium and titanium ranging from 1/1 to 50/1,
and adding an inert solid in granular form;
(b) separating the compound D from said mixture prepared in (a) until a solid is obtained, wherein the D/Ti ratio ranges from 1.5 to 40,
(c) forming a suspension of said solid in a liquid hydrocarbon medium,
(d) adding to said suspension organo-oxygenated protic compound $D_p$, in a quantity that the molar ratio $D_p$/D ranges from 0.2 to 1.2 and heating the mixture to a temperature ranging from 40 to 100° C., for a period varying from 5 minutes to 5 hours.

2. The process according to claim 1, wherein said inert solid is selected from the group consisting of: silica, titania, silico-aluminates, calcium carbonate, and magnesium chloride; the inert solid has an average granule size ranging from 10 μm to 300 μm.

3. The process according to claim 1, wherein said inert solid has microspheroidal silica having an average diameter ranging from 20 to 100 μm, a BET surface area ranging from 150 to 400 m$^2$/g, a total porosity equal or higher than 80% and an average pore radius of 50 to 200 Å.

4. The process according to claim 1, wherein said magnesium chloride is in amorphous form.

5. The process according to claim 1, wherein, in said (a), the atomic ratio between magnesium and titanium ranges from 1.0 to 50 and the ratio (D moles)/(Ti atoms) ranges from 5 to 100.

6. The process according to claim 1, wherein said (a) is carried out at a temperature ranging from room temperature to a boiling point of the donor compound D, until at least 80% of said compounds of Ti and Mg are dissolved.

7. The process according to claim 1, wherein said (b) is carried out by evaporation.

8. The process according to claim 1, wherein the reaction mixture in said (d) is heated to a temperature of 60 to 80° C., for a period ranging from 5 to 60 minutes.

9. The process according to claim 1, wherein said organo-oxygenated protic compound $D_p$ comprises an organic acid.

* * * * *